United States Patent
Schmid et al.

(10) Patent No.: US 9,479,109 B2
(45) Date of Patent: Oct. 25, 2016

(54) DEVICE FOR FASTENING PV MODULES TO ROOFS HAVING A TRAPEZOIDAL METAL SHEET

(71) Applicants: SCHLETTER GMBH, Kirchdorf (DE); DR. ZAPFE GMBH, Kirchdorf (DE)

(72) Inventors: Bernhard Schmid, Rechtmehring (DE); Bernd Koch, Wasserburg am Inn (DE)

(73) Assignees: SCHLETTER GMBH, Kirchdorf (DE); DR. ZAPFE GMBH, Kirchdorf (DE)

( * ) Notice: Subject to any disclaimer, the term of this patent is extended or adjusted under 35 U.S.C. 154(b) by 0 days.

(21) Appl. No.: 14/890,532
(22) PCT Filed: Jun. 6, 2014
(86) PCT No.: PCT/DE2014/000280
§ 371 (c)(1),
(2) Date: Nov. 11, 2015
(87) PCT Pub. No.: WO2015/024542
PCT Pub. Date: Feb. 26, 2015

(65) Prior Publication Data
US 2016/0111998 A1  Apr. 21, 2016

(30) Foreign Application Priority Data
Jun. 6, 2013 (DE) .................. 20 2013 005 102 U

(51) Int. Cl.
*F24J 2/52* (2006.01)
*H02S 20/23* (2014.01)
*F16M 13/02* (2006.01)

(52) U.S. Cl.
CPC ............. *H02S 20/23* (2014.12); *F16M 13/02* (2013.01); *F24J 2/5247* (2013.01); *F24J 2/5249* (2013.01); *F24J 2/5258* (2013.01); *Y02B 10/12* (2013.01); *Y02B 10/20* (2013.01); *Y02E 10/47* (2013.01)

(58) Field of Classification Search
CPC ............. E05D 1/00; E05D 1/04; E05D 1/06; E05D 7/10; E05D 2005/102; Y02E 10/47; Y02E 10/50; F24J 2/5249; F24J 2/5245; F24J 2/5258; H02S 20/23; H02S 20/24
See application file for complete search history.

(56) References Cited

U.S. PATENT DOCUMENTS 7,240,400 B2 *  7/2007  Bonham .................. E05D 5/06
                                                          16/238
8,430,372 B2 *  4/2013  Haddock ............. E04F 13/0821
                                                          248/500

FOREIGN PATENT DOCUMENTS

DE              200 14 058 U1   1/2001
DE       20 2005 007 855 U1     8/2005
(Continued)

OTHER PUBLICATIONS

European Patent Office. PCT International Search Report dated Dec. 18, 2014. International Application No. PCT/DE2014/000280. International Filing Date: Jun. 6, 2014. Name of Applicant: Schletter GMBH. German Language. 6 pages.
(Continued)

*Primary Examiner* — Rodney Mintz
*Assistant Examiner* — Daniel Kenny
(74) *Attorney, Agent, or Firm* — Moore & Van Allen PLLC; Henry B. Ward, III

(57) ABSTRACT

Device for fastening at least one PV module (1) to a roof which comprises a trapezoidal metal sheet (2) with a trapezoidal bead (3) with two oblique sides (4, 5) and an upper side (6), wherein the device comprises: exactly one holding plate (10) for fastening to one of the two oblique sides (4, 5), a supporting face (11), a holding-down element (12) for clamping the at least one PV module (1) against the supporting face (11), a threaded shaft (13) which is assigned a central shaft axis (S) and which is provided for actuating the holding-down element (12) in the direction of the supporting face (11), exactly one hinge joint (R, 14, 15) which is assigned a central axis of rotation (R) and by means of which the exactly one holding plate (10) and the threaded shaft (13) are rotatably coupled to one another and which has a joint pin (14) and a pin receptacle (15), wherein the threaded shaft (13) and the joint pin (14) are arranged perpendicular to one another in such a way that a common plane (E) results in which both the threaded shaft (13) extends in parallel and the joint pin (14) extends in parallel.

11 Claims, 4 Drawing Sheets

(56) References Cited

FOREIGN PATENT DOCUMENTS

Figure 1:
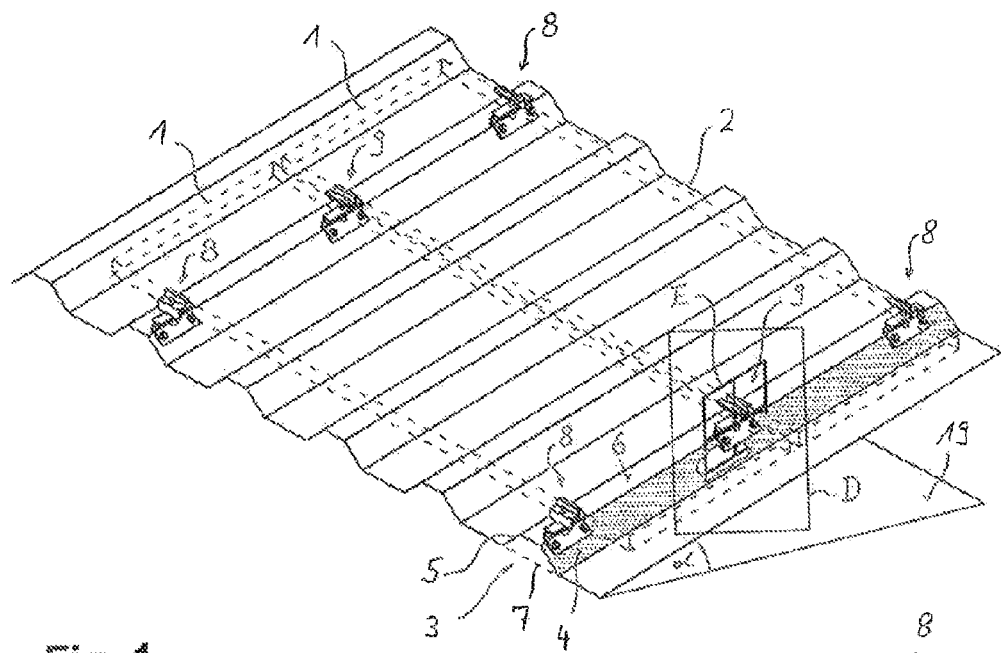

| | | |
|---|---|---|
| DE | 202009 003 862 U1 | 6/2009 |
| DE | 10 2008 009 608 A1 | 10/2009 |
| DE | 10 2009 024 424 A1 | 12/2009 |
| DE | 20 2010 001 238 U1 | 4/2010 |
| DE | 20 2010 007 000 U1 | 9/2010 |
| DE | 20 2010 007 234 U1 | 10/2011 |
| DE | 20 2012 005 672 | 6/2012 |
| DE | 20 2012 101 633 | 8/2012 |
| JP | 2007-284956 A | 11/2007 |

OTHER PUBLICATIONS

Google. Google Translation of amended Abstract on page 3 of the PCT International Search Report dated Dec. 18, 2014. Translated German Language to English Language. https://www.google.com/webhp?sourceid=chrome-instant&ion=1&espv=2&ie=UTP-8#q=translate%20german%20to%20english. Retrieved: Oct. 21, 2015. 1 page.

European Patent Office. PCT Written Opinion of the International Searching Authority. International Application No. PCT/DE2014/000280. International Filing Date: Jun. 6, 2014. German Language.

* cited by examiner

DEVICE FOR FASTENING PV MODULES TO ROOFS HAVING A TRAPEZOIDAL METAL SHEET

The present invention relates to a device for fastening photovoltaic modules onto roofs having a trapezoidal metal sheet.

Photovoltaic modules, abbreviated PV modules are often installed on roofs covered by trapezoidal metal sheets. Trapezoidal metal sheets have trapezoidal beads which usually have two oblique sides, a top side and an open bottom side. The shape of the trapezoidal beads may differ greatly from one roof to the next, which necessitates individually shaped or universally adaptable fasteners.

JP 2007-284956 A discloses a device for fastening a PV module onto a roof having a trapezoidal metal sheet. This device is suitable for different bead shapes and comprises two side elements which are fastened onto two oblique sides of a trapezoidal bead of the trapezoidal metal sheet, and a supporting part having a supporting face, on which the PV module rests. The two side elements are movably hinge connected to the supporting part by means of two hinge joints and are thereby adaptable to oblique sides with a different inclination. Furthermore, the device has a hold-down element, with which the PV module is clamped against the supporting surface. The hold-down element and the supporting part are connected to one another by means of a threaded shaft for clamping. The threaded shaft runs centrally between the two hinged joints, so that clearances are provided between the threaded shaft and the two hinge joints. The device comprises numerous components; it has a complex design and is difficult to install. DE 20 2010 007 000 U1, DE 20 2009 003 862 U1 and DE 20 2010 001 238 U1 disclose devices having a similar principle, wherein the distance between the two holding plates is also variable.

One object of the present invention is to improve upon a device of the type defined in the introduction with regard to consumption of materials, manufacturing complexity and assembly time, while retaining a high load-bearing capacity.

This object is achieved with the device according to claim 1. Accordingly, the device is provided for fastening at least one PV module onto a roof having a trapezoidal metal sheet. The trapezoidal metal sheet may have a trapezoidal bead of a known type having two oblique sides and one top side.

The device also comprises exactly one holding plate, which is provided for fastening onto one of the two oblique sides. The other oblique side may therefore remain completely untouched by the device. The device also comprises a supporting face as well as a hold-down element for clamping the at least one PV module against the supporting face.

Furthermore, the device comprises a threaded shaft to which is assigned a central shaft axis and which is provided for operating the hold-down element in the direction of the supporting face and exactly one hinge joint. By means of the hinge joint, the holding plate and the threaded shaft are rotatably coupled to one another. The hinge joint has a central rotational axis, a joint axle and an axle receptacle. The joint axle may be accommodated on an axle receptacle of the hinge joint and is rotationally supported. Furthermore, it is provided that the threaded shaft and the hinge joint are arranged perpendicular to one another.

It is characteristic of the invention that the device has only a single holding plate and therefore needs only a single rotational joint or hinge joint. It is paired with the holding plate and the threaded shaft. Use of materials, manufacturing complexity and assembly time can therefore be reduced substantially. In addition, the threaded shaft and the joint axle are arranged so that there is theoretically a common plane, in which the threaded shaft runs in parallel and also the joint axle runs in parallel. The force flow in the device can therefore be improved and the quantity of material can be further reduced. In addition, the device can be supplied in a preassembled module.

The holding plate can be fastened onto exactly one of the two oblique sides of the trapezoidal bead and embodied as a plate in at least one section and may contain openings for screws or rivets. In one arrangement, the holding plate may be positioned parallel to the oblique side and may be in direct contact there or by means of an elastic layer. Such an elastic layer may be made of EPDM rubber or of comparable elastomers.

The at least one PV module may be arranged between the supporting face and the hold-down element. This supporting face is provided for carrying the at least one PV module. The supporting face may be arranged on the holding plate, the joint axle or the axle receptacle. The supporting face may also be provided on a supporting part, which is rigidly connected to one of the aforementioned components or is designed to be integral. Alternatively, the supporting part may also be provided as a separate component and may be in contact with the holding plate, the joint axle or the axle receptacle. Furthermore, it is possible to clamp the PV module against the top side of the trapezoidal bead, so that the supporting face is embodied by means of the top side or a support arranged thereon.

The hold-down element may be embodied in a traditional form as a so-called center clamp or end clamp, such as those known from DE 200 14 058 U1, DE 20 2005 007 855 U1, DE 10 2009 024 424 A1, DE 20 2010 007 234 U1, DE 20 2012 101 633 71, for example. Standard components can therefore be used for the hold-down element.

Center clamps are used for joint clamping of two neighboring PV modules. They have two horizontal sections facing away from one another for holding down the two neighboring PV modules. In most cases, two vertical walls spaced a distance apart from one another are also provided and can secure the PV modules at the sides. Furthermore, a horizontal connecting section is usually provided, connecting the sections and walls mentioned above to one another and has an opening for passing a fastening screw or the like through it. In contrast with the end clamps, center clamps usually rest on only the two neighboring PV modules, not on a supporting face of a mounting frame. Center clamps can therefore be used universally for PV modules of various heights.

End clamps are used for securely clamping a single PV module at the end of a row of PV modules. Instead of two horizontal sections, they have only one horizontal section for holding down the PV module and have one vertical wall for gripping the PV module at the side as well as a vertical supporting section, by means of which the end clamp can be supported against a supporting face of a mounting frame. The supporting face is usually the supporting face on which the PV module rests. The vertical supporting section and the vertical wall are usually integrally connected to one another by means of a horizontal connecting section. An opening for passing a fastening screw through it or the like may also be contained in the horizontal connecting section. Because of the support on the supporting face of the mounting frame, end clamps are suitable only within comparatively narrow mounting tolerances for PV modules with certain heights, for example, in the range of 2 millimeters.

The threaded shaft is a shaft having a thread in at least one section. The threaded shaft may have a cylindrical shape and may pass through the hold-down element and the supporting face or may also run between the partial faces of a multipart supporting face. The threaded shaft may be part of an ordinary head screw. The head of such a head screw usually has a larger diameter than the thread of the threaded shaft. The head can axially secure the hold-down element on the side facing away from the supporting face. As an alternative to the head screw, a nut, which is in threaded engagement with the threaded shaft and secures the hold-down element axially on one side instead of the screw head may be used.

The joint axle and the axle receptacle may have cylindrical or circular sliding faces in at least some sections, which together form a sliding pair. One or more segments or sectors of a cylinder may be sufficient for the sliding faces, in particular if the rotational path of the hinge joint is limited. The sliding faces of the joint axle may be convex, and those of the axle receptacle may be concave. Alternatively, it is conceivable for the joint axle to be hollow and to have concave sliding faces and for the axle receptacle to be embodied as concave accordingly, so that the joint axle surrounds the axle receptacle. The term "cylindrical" is also understood to mean cylindrical in general, i.e., elliptical or even prismatic, for example. It is conceivable for the joint axle to be polygonal and for the edges to form the sliding faces. However, circular cylindrical sliding faces are preferred.

The feature whereby a common plane is formed containing both the threaded shaft and the joint axle can alternatively be formulated as follows: the threaded shaft having a first radius and the joint axle having a second radius intersect at a distance less than the sum of the first radius and the second radius. The distance is preferably less than the first radius and/or less than the second radius. The distance is ideally as small as possible within the context of suitable manufacturing tolerances.

The threaded shaft and the joint axle are arranged perpendicular to one another, i.e., most specifically, the central shaft axis and the central rotational axis run perpendicular to one another. It is self-evident that two straight lines are perpendicular to one another when their direction vectors are mutually perpendicular. Accordingly, two straight lines may also be perpendicular to one another in space even without a common point of intersection.

The device is suitable for framed PV modules in particular. However, it is also possible to fasten unframed PV modules using this device. Furthermore, the device is especially suitable for horizontal storage of PV modules. Horizontal storage refers to storage in which approximately horizontal frame sections or edges of the PV module are clamped because in practice trapezoidal metal sheets are usually arranged at an inclination, such that the trapezoidal beads run from top to bottom with at least a slight inclination in order to facilitate rain water running off. Accordingly, the hold-down elements are usually oriented horizontally in an arrangement, i.e., running across the trapezoidal beads.

In one embodiment, the central rotational axis can penetrate through the threaded shaft or an imaginary extension thereof, or in other words, may intersect it. The imaginary extension of the threaded shaft may be coaxial and cylindrical. Additionally or alternatively, the central shaft axis may penetrate through or, in other words, intersect with the joint axle or an imaginary extension thereof. The imaginary extension of the joint axle may also be coaxial and cylindrical.

In one refinement, the central rotational axis of the hinge joint and the central shaft axis of the threaded shaft may intersect one another at a distance smaller than the radius of the threaded shaft, in particular smaller than one-half or one-third of the radius of the threaded shaft. Such a distance expediently corresponds to the manufacturing tolerances for such a device. Due to the small distance, the force flow may run as directly as possible, and moments acting on the joint axle can be reduced. In the ideal case, the rotational axis and the central shaft axis of the threaded shaft may intersect one another, i.e., the distance is then equal to zero.

In one embodiment, it is provided that the holding plate together with the axle receptacle forms a rotational rigid unit. The axle receptacle may therefore be fastened or integrally molded or provided as an integral part directly on the holding plate. The threaded shaft can be secured on the joint axle by means of an auxiliary component. Such an auxiliary component can itself act as an axle receptacle, so that the joint axle is not secured with regard to the holding plate or with regard to the threaded shaft. However, it is preferable if the threaded shaft together with the joint axle forms another rotationally rigid unit. Such rotationally rigid units are capable of rotating in relation to one another with respect to the central rotational axis.

It is also possible to provide an integral molding, to which the threaded shaft is fastened. Such an integral molding may lead out of the axle receptacle and optionally be guided around it. In a preferred refinement, it is provided that the threaded shaft is fastened directly onto the joint axle. Direct fastening may be accomplished, for example, by pressing, welding, gluing or the like, wherein the threaded shaft can be fastened centrally to the joint axle and therefore the two together may form a T shape. Furthermore, it is possible for the threaded shaft to be provided integrally on the joint axle.

The threaded shaft may be in threaded engagement with the joint axle. Therefore, a clamping height between the supporting face and a hold-down element can be adjusted in a wide range. This is particularly advantageous if the threaded shaft is that of a head screw. It may also be advantageous if the diameter of the joint axle is greater than the diameter of the threaded shaft, in particular by a factor of 1.5 to 2.5. Furthermore, the joint axle may have an opening with an inside thread, wherein the threaded shaft is in threaded engagement with the inside thread.

In addition, it is possible that the joint axle has a through-opening with an inside thread and the threaded shaft having the inside thread is in threaded engagement with the inside thread, and the threaded shaft is able to penetrate through the joint axle. The clamp height between the supporting face and the hold-down element can therefore be adapted in a particularly wide range, so that PV modules of various heights can be fastened, for example, in a range of 5 millimeters, using a given hold-down element and a given threaded shaft. Depending on the height of the PV module, the threaded shaft may end inside the through-hole or at the edge of the through-hole or may fit the through-hole, so that the threaded shaft protrudes by a few millimeters, for example. A large bandwidth of PV modules of different heights can therefore be fastened to a few threaded shafts of various lengths. This is an advantage in particular when the threaded shaft is that of a head screw.

The axle receptacle can be accommodated in a region facing the hold-down element, so that the threaded shaft penetrates through the axle receptacle there. Furthermore, it is possible to provide that the axle receptacle is also accommodated in a region facing away from the hold-down element and the threaded shaft can penetrate there. This can further enlarge the adjustment region for the clamping height at a given length of the threaded shaft.

In one embodiment, the supporting face is provided on the outside of the axle receptacle or integrally on the holding plate. The integrated supporting face may have a convex design, in particular being a circular cylinder, so that with an oblique side at different inclinations, the PV module can always make contact with the supporting face tangentially. In the case of a convex axle receptacle and a concave joint axle, such a supporting face may be provided integrally on the outside of the joint axle and may be embodied as flat and perpendicular to the threaded shaft.

Furthermore, it is possible for a supporting part to be provided with the supporting face, wherein the supporting part is arranged between the hinge joint and the hold-down element, in particular between the axle receptacle and the hinge joint. The supporting face is consequently part of the face of the supporting part. The supporting part may preferably slide on the outside of the axle receptacle. "On the outside" here refers to one side of the axle receptacle, which faces away from the joint axle. In this embodiment, the supporting face on the supporting part may be designed to be flat, so that the PV module can rest flatly there in a protective manner. The threaded shaft may act as an entraining element for the supporting part. The supporting part may therefore contain a through-opening, which the threaded shaft passes through perpendicularly.

To facilitate the sliding, the supporting part may have a concave sliding face, and the axle receptacle may have a convex sliding face on the outside, wherein the concave and convex sliding faces together form a sliding pair. The supporting part is thereby guided well, in particular when the supporting part is rotated together with the joint axle and the threaded shaft.

In another embodiment, the joint axle may have an integral molding, which leads out of the axle receptacle and around it and carries the supporting face. The supporting face here may also be flat and perpendicular to the threaded shaft.

In one variant, it is provided that the holding plate together with the joint axle forms a rotationally rigid unit. The joint axle may be fastened directly onto the holding plate or integrally molded thereon. The holding plate and the joint axle may therefore be manufactured in one piece. Furthermore, the threaded shaft together with the axle receptacle may form another rotationally rigid unit. The supporting face may be provided integrally on the axle receptacle or in the form of a supporting part and may be flat and perpendicular to the threaded shaft. In one refinement, it is provided that the threaded shaft is fastened directly onto the axle receptacle. The threaded shaft may be in threaded engagement with the axle receptacle. The axle receptacle may have an opening with an inside thread, wherein the threaded shaft is in threaded engagement with the inside thread. Furthermore, it is possible for the axle receptacle to have a through-opening with an inside thread and for the threaded shaft to be in threaded engagement with the inside thread and for the threaded shaft to pass through the axle receptacle. This is particularly advantageous when the threaded shaft belongs with a head screw. The joint axle may be exposed in a region next to the central shaft axis.

In one embodiment, it is provided that the holding plate has a recess, into which the threaded shaft can penetrate. The aforementioned adjustment region can therefore be further enlarged.

In one embodiment, a screw may be provided with the threaded shaft and a screw head, wherein the screw head secures the hold-down element axially. The screw head can secure the hold-down element axially on the side facing away from the supporting face. This embodiment is especially suitable when the threaded shaft of the screw is in threaded engagement with the joint axle or the axle receptacle. In this way, PV modules of different heights can be clamped together using a screw of a predefined length, for example, in the range of 5 millimeters.

A screw nut, which is in threaded engagement with the threaded shaft and secures the hold-down element axially on the side facing away from the supporting face, may be provided as an alternative to the screw head. The screw nut may preferably be a so-called cap nut. In contrast with ordinary screw nuts, cap nuts permit an attack without lateral wrap-around, which saves on assembly space and allows a narrow design of the hold-down element. This alternative with a screw nut is suitable in particular when the threaded shaft is permanently attached to the joint axle or the axle receptacle, whether due to an integral design or due to pressing, gluing, welding or the like.

In one embodiment, at least one end stop is provided, limiting the rotational path between the joint axle and the axle receptacle. The end stop can prevent unacceptable assembly positions, for example, in oblique sides with an inclination of less than 45°. The end stop may be provided on the outside of the axle receptacle and can cooperate with the aforementioned supporting part.

In one embodiment, the holding plate has a stop, which is provided for contact with the top side. Such a stop may function as a positioning aid during the contact and fastening of the holding plate. Furthermore, comparable positioning with respect to the edge between the oblique side and the top side can always be achieved with the help of the stop using beads of various shapes. Therefore, the distance between the top side of the trapezoidal bead and the bottom side of the PV module remains constant within a range of a few millimeters.

In one embodiment, a spring may be provided between the supporting face and the hold-down element. This spring can be arranged coaxially on the threaded shaft and can force the hold-down element into a maximally opened position, so that the hold-down element need not be elevated separately during the insertion of a PV module between the supporting face and the hold-down element.

In one embodiment, at least the holding device, the axle receptacle, the joint axle, the supporting part or the hold-down element may be an extruded workpiece, preferably made of corrosion-resistant aluminum. Furthermore, it is possible to extrude the holding plate together with the axle receptacle or the joint axle. The supporting part can be extruded together with the joint axle.

In an arrangement with the device and a trapezoidal metal sheet with a trapezoidal bead having two oblique sides and one top side, the holding plate may be fastened onto one of the two oblique sides, wherein the common plane passes through this one oblique side. The common plane thus runs laterally past the top side without penetrating through it. Alternatively or additionally, it is possible to provide for the central shaft axis to pass through this one oblique side.

Figure 2:
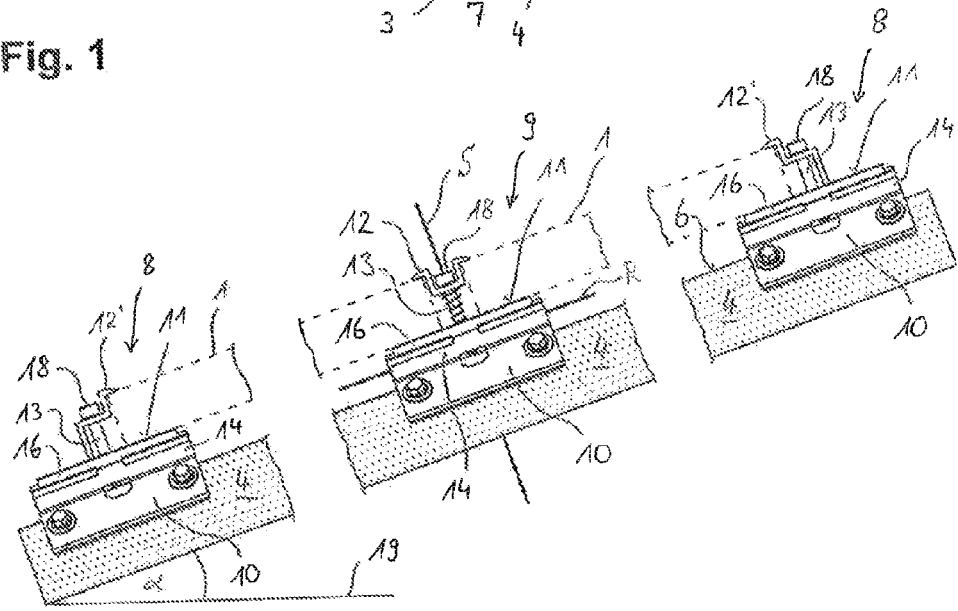
Figure 3:
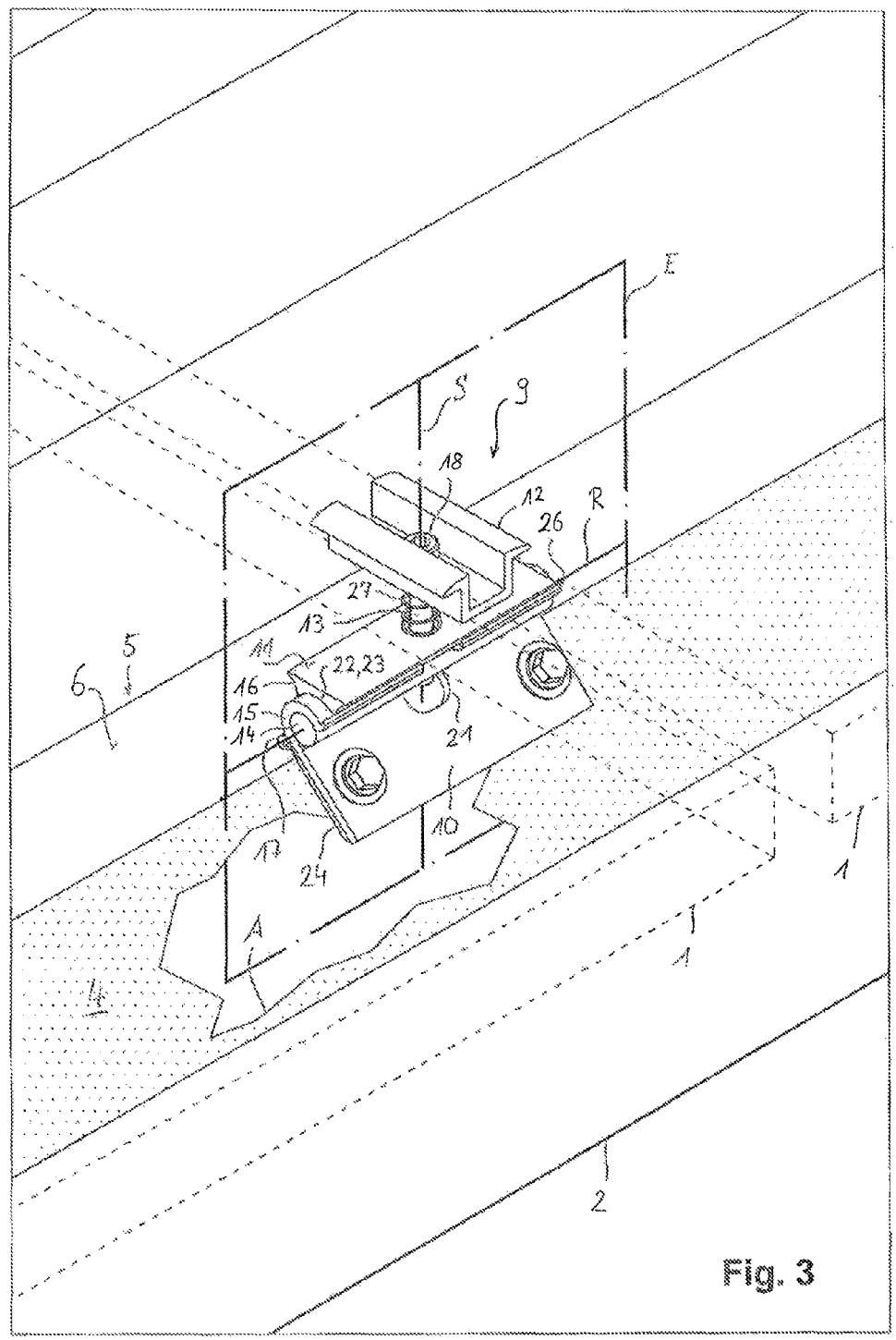
Figure 4:
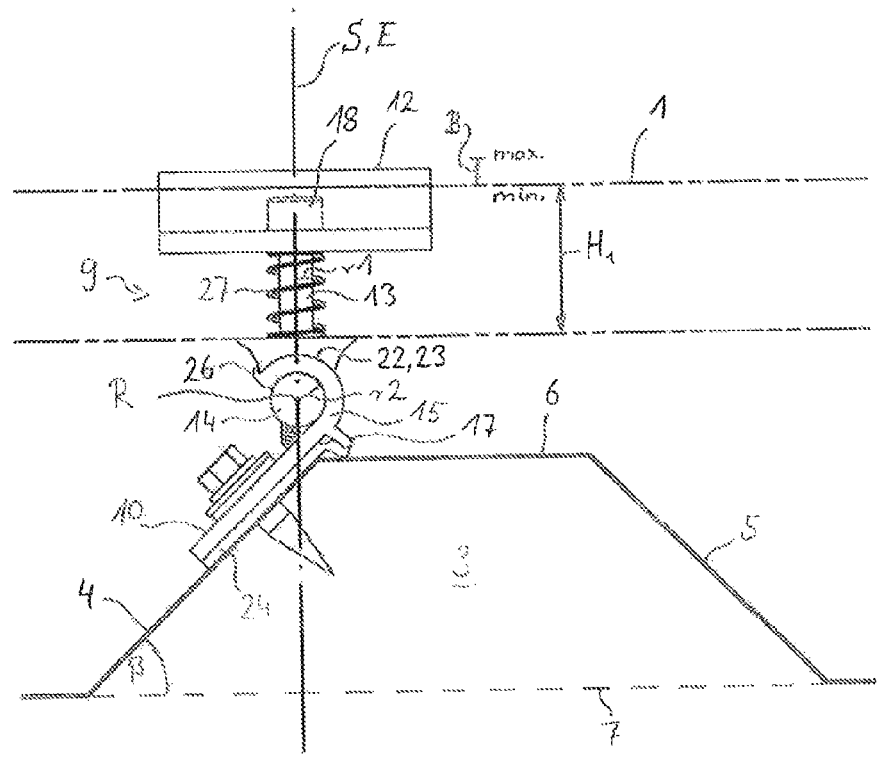
Figure 5:
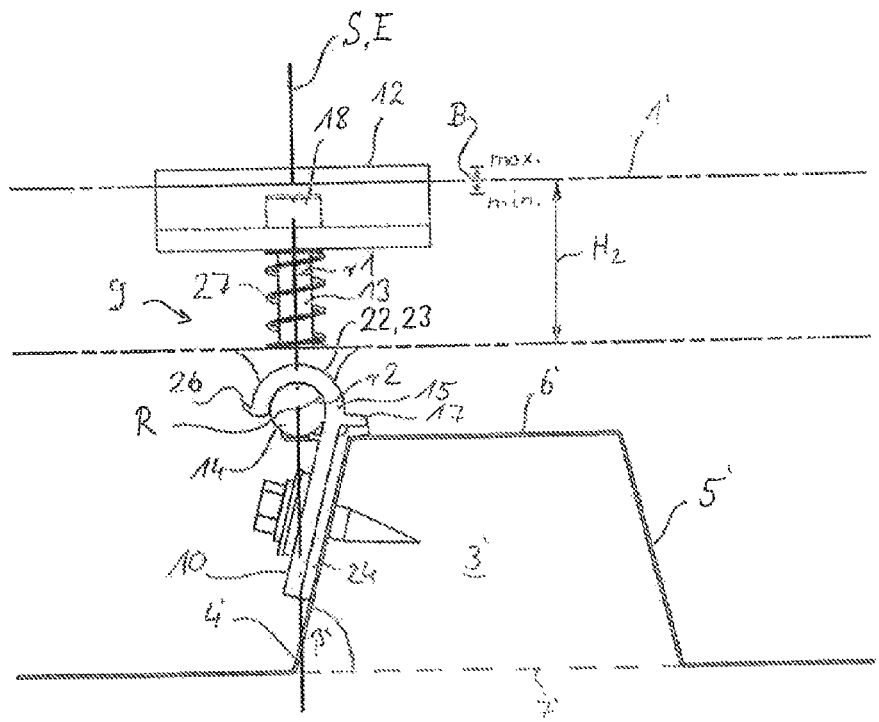
Figure 6:
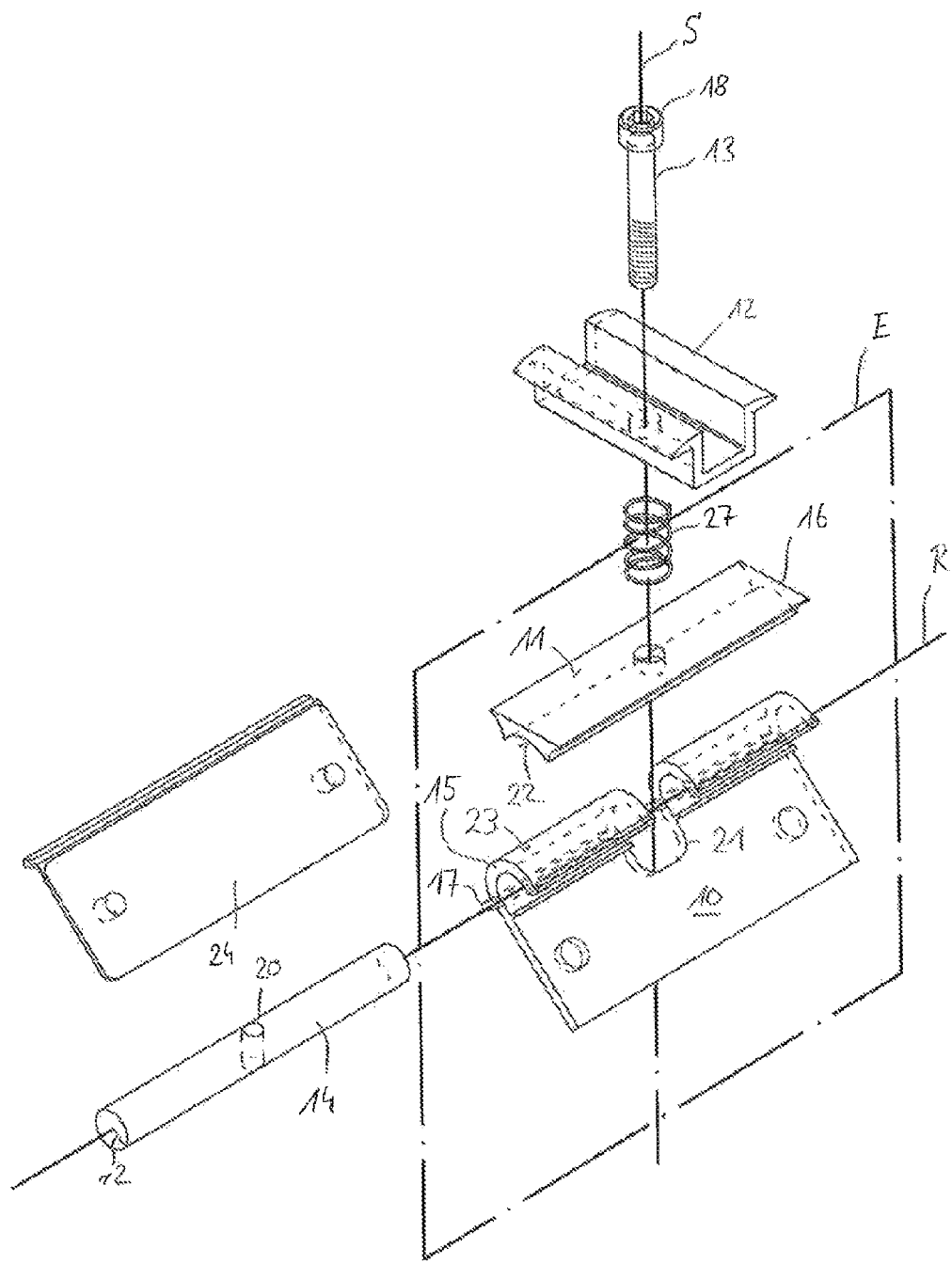

One exemplary embodiment of the invention is explained in greater detail below on the basis of the drawings, in which:

FIG. 1 shows an oblique view of an arrangement having two PV modules, which are fastened onto a trapezoidal metal sheet by means of several devices according to the invention, FIG. 2 shows a front view of the arrangement according to FIG. 1, FIG. 3 shows an oblique view of the arrangement according to one detail of FIG. 1 with one of the devices in detail, FIG. 4 shows a side view of the arrangement in the region of the device according to FIG. 3, FIG. 5 shows a side view of an arrangement having a PV, module which is fastened onto another trapezoidal metal sheet by means of the device according to FIG. 3, FIG. 6 shows an exploded view of the device according to FIG. 1.

The system illustrated in FIGS. 1 through 4 comprises two PV modules, which are arranged on a trapezoidal metal sheet 2 by means of several devices 8 and 9 according to the invention. The trapezoidal metal sheet 2 comprises, in the manner known for reinforcement, several trapezoidal beads 3, each having two oblique sides 4 and 5, one top side 6 and one open bottom side 7. The oblique sides 4 and 5 converge toward the top side 6 and are connected thereby. An inclined roof (not shown in detail here) can be covered by the trapezoidal metal sheet 2. The trapezoidal metal sheet 2 is therefore inclined at an angle α to the horizontal plane 19. Trapezoidal beads 3 run from top to bottom, approximately parallel to the inclination of the trapezoidal metal sheet 2, so that rain water can run off unimpeded.

PV modules 1 are represented schematically with broken lines and have a frame (not shown in greater detail here). The PV modules are supported horizontally, which means that they are fastened onto their frame sections running horizontally. The PV modules 1 form a short module row in the direction of the trapezoidal beads 3. Each PVC module 1 is fastened onto the trapezoidal metal sheet 2 in four locations. The frame sections running horizontally at the end of the module row are each fastened with two devices 8. The frame sections running horizontally, which are opposite one another on the inside of the module row, are fastened jointly using two devices 9.

One of the two devices 9 is shown in detail in FIGS. 3, 4 and 6. The device 9 includes a single holding plate 10, which is fastened only onto the oblique side 4 of the trapezoidal beads 3. This oblique side 4 is shown with dots for the sake of illustration. The other oblique side 5 of this trapezoidal bead 3 remains entirely unaffected by the device 9.

In addition, the device 9 has a supporting part 16 with a planar supporting face 11 for carrying the PV modules 1. In the installed state, the PV modules 1 sit with their frame sections running horizontally on the supporting face 11. The device 9 also includes a hold-down element 12 for clamping the PV modules 1 against the supporting face 11. The hold-down element 12 of the device 9 is designed as a so-called center clamp. However, the hold-down elements 12' of the devices 8 are embodied as so-called end clamps.

The device 9 also comprises a screw having a threaded shaft 13 and a screw head 18. A central shaft axis S is theoretically provided with the threaded shaft 13. The threaded shaft 13 is a circular cylinder and has an outside thread on an end section opposite the screw head 18. The screw, including the threaded shaft 13, is provided for actuating the hold-down element 12 in the direction of the supporting face 11. The threaded shaft 13 passes continuously and perpendicularly through the hold-down element 12 as well as the supporting part 16, including the supporting face 11. The screw head 18 rests on a side of the hold-down element 12 facing away from the supporting face 11, so that the hold-down element 12 is secured on one end axially by means of the screw.

The device 9 also includes a single hinge joint, which is assigned to the holding plate 10. Apart from clearance tolerances and a minor axial displaceability, the hinge joint leaves only one rotational degree of freedom. It can also be referred to as a rotational joint. A central rotational axis R is theoretically assigned to the hinge joint. The holding plate 10 and the threaded shaft 13 are linked together rotationally with respect to the central rotational axis R by means of the hinge joint.

The hinge joint has a joint axle 14 and an axle receptacle 15, wherein the joint axle 14 is accommodated in the axle receptacle 15 and is mounted, so that it has rotational mobility. The axle receptacle 15 has a concave circular cylindrical sliding face on the inside over a sector of approximately 190° and is embodied as open in the remaining sector. A narrow holding strip on one edge of the axle receptacle 15 blocks the joint axle 14 from escaping radially out of the axle receptacle 15. For the joining, the joint axle 14 is to be inserted axially into the axle receptacle 15. The joint axle 14 is embodied as a round pin and has concave circular cylindrical sliding faces.

The axle receptacle 15 is provided integrally on the holding plate 10. The axle receptacle 15 and the holding plate 10 are thus embodied together on a single component and form a first rotationally rigid unit of the hinge joint. The axle receptacle 15 as well as the holding plate 10 and the joint axle 14 run parallel to the trapezoidal bead 3.

As can be seen from FIGS. 4 and 6 in particular, the threaded shaft 13 and the joint axle 14 are arranged at a right angle to one another, i.e., more specifically, the central shaft axis S is arranged perpendicular to the central rotational axis R. It is characteristic in particular that theoretically, a common plane E is provided, in which the threaded shaft 13 runs in parallel and also the joint axle 14 runs in parallel. In other words, the common plane E is parallel to the threaded shaft 13 and is also parallel to the joint axle 14 and thus intersects both the threaded shaft 13 and the joint axle 14. In other words, the threaded shaft 13 and the joint axle 14 intersect at a distance less than the sum of the radius r1 of the threaded shaft 13 and the radius r2 of the joint axle 14. The common plane E is represented as a rectangle with dash-dot lines in FIGS. 4 and 6 for the sake of illustration.

In the present example, the distance is so small that the central rotational axis R penetrates through the threaded shaft 13 and the central shaft axis S penetrates through the joint axle 14, and the distance is smaller than one-third of the radius of the threaded shaft 13 within the context of a suitable manufacturing tolerance. In the drawing, the distance between the central rotational axis R and the central rotational axis S [sic; shaft axis S] of the joint axle is equal to zero, so that the central rotational axis R and the central rotational axis therein intersect at a single point. The plane E therefore includes both the central shaft axis S and the central rotational axis R.

The threaded shaft 13 is provided centrally to the joint axle 14, so that together they form a T shape. The screw having the threaded shaft 13 is also fastened directly onto the joint axle 14, i.e., more specifically the threaded shaft 13 is in threaded engagement with the joint axle 14. The screw with the threaded shaft 13 and the joint axle 14 therefore form a second rotationally rigid unit of the hinge joint. A through-opening with an inside thread with which the threaded shaft 13 is in threaded engagement is present at the center of the joint axle 14. The diameter of the joint axle 14 is therefore selected to be greater than the diameter of the threaded shaft 13 by a factor of approximately two. The threaded shaft 13 can pass through the through-opening, so that at a given length of the threaded shaft 13, there is nevertheless a large clamping region for PV modules 1 of different heights.

The threaded shaft 13 penetrates through a wall of the axle receptacle 15 at least once, namely in a region facing the hold-down element 12 and optionally in a region facing away from the hold-down element 12 if the threaded shaft 13 passes through the through-hole in the joint axle 14. The wall of the axle receptacle 15 is removed in these regions. Furthermore, the holding plate 10 has a recess 21, into which the free end of the threaded shaft 13 can penetrate during assembly, if necessary, as shown in FIG. 4 in particular. Therefore, an adjustment region B for the clamping height $H_1$ between the supporting face 11 and the hold-down element 12 can be further increased, so that at a predefined length of the threaded shaft 13, PV modules 1 of different heights can be fastened, for example, in a range of 5 millimeters. The height of the PV module 1, i.e., more specifically, the height of its frame, thus matches the clamping height $H_1$.

The supporting part 16 is arranged between the axle receptacle 15, and the hold-down element 12 and is situated on the outside of the axle receptacle 15, as can be seen in detail from FIGS. 3, 4 and 6. A sliding pair provided between the supporting part 16 and the axle receptacle 15 has a concave circular cylindrical sliding face 22 on the supporting part 16 and a convex circular cylindrical sliding face 23 on the outside of the axle receptacle 15. The threaded shaft 13 passes through the supporting part 16, so that the supporting part 16 is jointly rotated when the threaded shaft 13 is rotated about the central rotational axis R. The supporting part 16 and the hold-down element 13 are therefore also parts of the second rotationally rigid unit of the hinge joint.

For assembly of the device 9, the holding plate 10 is fastened onto the oblique side 4 by means of screws. The holding plate 10 therefore has predefined boreholes for passing the screws through and is positioned in parallel with the surface of the oblique side 4 in the installed state. For surface protection of the trapezoidal bead 3 and for sealing against the admission of rain water, the device comprises an elastic layer 24. The elastic layer 24 can be seen in FIG. 4 in particular. The elastic layer 24 is made of EPDM rubber, premounted on the holding plate and arranged between the holding plate 10 and the oblique side 4 in the installed state. Consequently, the holding plate 10 is in contact with the oblique side 4 by means of the elastic layer 24.

To facilitate and simplify the positioning of the holding plate 10, the holding plate 10 has a stop 17. The stop 17 is embodied as a narrow strip and is integrally molded on the holding plate 10 at the location facing the oblique side 4. The elastic layer 24 extends to beneath the stop 17, so that in the installed state, the stop 17 rests on the top side 6 of the trapezoidal bead 3 with the elastic layer 24 in between.

The holding plate 10, including the axle of receptacle 15 and the stop 17, is an extruded part, wherein the openings in the holding plate 10 and the recess 21, for example, have been introduced subsequently. The joint axle 24, the supporting part 16 and the hold-down element 12 are also each extruded parts, and their through-openings have also been introduced subsequently.

For fastening the PV modules 1, these are inserted between the supporting face 11 and the hold-down element 12 and are placed on the supporting face 11. The hold-down element 12 here and thus also the screw having the threaded shaft 13 and the joint axle 14 as well as the supporting part 16 are swiveled, so that the threaded shaft 13 is perpendicular to the top side 6 and to the PV modules 1. Next, the screw having the threaded shaft 13 is actuated using a suitable screw tool, so that the hold-down element 12 holds the PV modules 1 down against the supporting surface 11 and clamps them there. Accordingly, the distance between the hold-down element 12 and the supporting surface 11 is reduced by means of the threaded shaft 13. In the clamped state, the threaded shaft 13 is under tensile stress. Both the central shaft axis S and the common plane E penetrate through the oblique side 4. The shaft axis thus runs laterally past the top side 6 without penetrating through it or the other oblique side 5.

To avoid unacceptable assembly positions, an end stop 26 is integrally molded on the outside of one edge and limits the rotational movement of the supporting part 16 with respect to the axle receptacle 15. The rotational path of the joint axle 14 is also limited indirectly because the supporting part 16 is connected to the joint axle 14 by the threaded shaft 13 in a rotationally rigid manner with respect to the central rotational axis R. In the angular position illustrated in FIG. 4, the supporting part 16 comes in contact with the end stop 26. This prevents fastening onto other flatter oblique sides at an angle β of less than 45° to the bottom side 7.

The device 9 also has a spring 27, which acts between the supporting face 11 and the hold-down element 12 and is arranged coaxially on the threaded shaft 13. The spring applies tension to the hold-down element 12, pulling it into an open position, so that the hold-down element 12 need not be elevated separately on insertion of the PV module 1 between the supporting face 11 and the hold-down element 12. The device 9 may thus be preassembled completely in a single module, as illustrated in FIG. 6.

The devices 8 illustrated in FIGS. 1 and 2 differ from the device 9 in that their hold-down elements 12' are end clamps, and no springs are provided on the threaded shaft 13.

When taken together, FIGS. 4 and 5 illustrate the variability of the device 9. In the arrangement shown in a similar side view in FIG. 5, the same device 9 is used, but a differently shaped trapezoidal bead 3' having two oblique sides 4' and 5', one top side 6' and one open bottom side 7' is provided. The oblique side 4' is designed to be much steeper than the oblique side 4 according to FIG. 3. The angle β' to the bottom side 7' is approximately 75°. Furthermore, a PV module 1' with a larger frame height is shown in the arrangement according to FIG. 5. The clamp height $H_2$ is thus greater than the clamp height $H_1$ according to FIG. 4. Depending on the height of the PV module 1 or 1', the threaded shaft 13 may end close to an edge of the through-hole 20 or may pass through the through-hole 20, as shown in FIG. 4, so that the threaded shaft 13 protrudes by a few millimeters and penetrates into the recess 21. Outside of the adjustment region B, a screw that is initially shorter or longer may be selected in increments of 5 millimeters, for example.

The invention claimed is:

1. A device for fastening at least one PV module on a roof having a trapezoidal metal sheet having a trapezoidal bead with two oblique sides and one top side, wherein the device comprises:
    exactly one holding plate for fastening onto one of the two oblique sides,
    a supporting face,
    a hold-down element for clamping the at least one PV module against the supporting face,
    a threaded shaft, which is paired with a central shaft axis and is provided for actuation of the hold-down element in the direction of the supporting face, exactly one hinge joint, which is paired with a central rotational axis and by means of which the exactly one holding plate and the threaded shaft are coupled to one another in a rotationally movable manner, and which has the one joint axle and one axle receptacle, wherein the threaded shaft and the joint axle are arranged to be mutually perpendicular, forming a common plane in which the threaded shaft runs in parallel and also the joint axle runs in parallel.

2. The device according to claim 1, wherein the central rotational axis and the central shaft axis intersect one another at a distance that is less than the radius of the threaded shaft.

3. The device according to claim 1, wherein the exactly one holding plate together with the axle receptacle forms a rotationally rigid unit.

4. The device according to claim 1, wherein the threaded shaft is in threaded engagement with the joint axle.

5. The device according to claim 1, wherein the joint axle has a through-opening with an inside thread; the threaded shaft is in threaded engagement with the inside thread, and the threaded shaft can penetrate through the joint axle.

6. The device according to claim 1, wherein a supporting part is provided with the supporting face, wherein the supporting part is arranged between the exactly one hinge joint and the hold-down element.

7. The device according to claim 1, wherein the supporting part has a concave sliding face and the axle receptacle has a convex sliding face on the outside, together forming a sliding pair.

8. The device according to claim 1, wherein a screw is provided, having a threaded shaft and a screw head, wherein the screw head secures the hold-down element axially.

9. The device according to claim 1, wherein the exactly one holding plate has a recess into which the threaded shaft can penetrate.

10. The device according to claim 1, wherein the exactly one holding plate has a stop, which is provided for contact with the top side.

11. An arrangement having a device according to claim 1, having a trapezoidal metal sheet, having a trapezoidal bead with two oblique sides and one top side, wherein the exactly one holding plate is fastened onto one of the two oblique sides, and the common plane passes through this one oblique side.

* * * * *